United States Patent
Cociglio (10) Patent No.: US 11,165,671 B2
(45) Date of Patent: Nov. 2, 2021

(54) PERFORMANCE MEASUREMENT IN A PACKET-SWITCHED COMMUNICATION NETWORK

(71) Applicant: TELECOM ITALIA S.p.A., Milan (IT)

(72) Inventor: Mauro Cociglio, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 266 days.

(21) Appl. No.: 16/342,330

(22) PCT Filed: Oct. 20, 2016

(86) PCT No.: PCT/EP2016/075169
§ 371 (c)(1),
(2) Date: Apr. 16, 2019

(87) PCT Pub. No.: WO2018/072828
PCT Pub. Date: Apr. 26, 2018

(65) Prior Publication Data
US 2019/0288924 A1    Sep. 19, 2019

(51) Int. Cl.
*H04L 12/26* (2006.01)
*H04W 4/02* (2018.01)

(52) U.S. Cl.
CPC .......... *H04L 43/024* (2013.01); *H04L 43/026* (2013.01); *H04L 43/028* (2013.01); *H04W 4/026* (2013.01)

(58) Field of Classification Search
CPC ... H04L 43/024; H04L 43/026; H04L 43/028; H04W 4/026

(Continued)

(56) References Cited

U.S. PATENT DOCUMENTS

| 6,738,349 B1 * | 5/2004 | Cen .......... H04L 43/00 370/231 |
| 7,403,137 B1 * | 7/2008 | Huang .......... H03M 7/30 341/106 |

(Continued)

FOREIGN PATENT DOCUMENTS

| WO | WO 2010/072251 A1 | 7/2010 |
| WO | WO 2013/174417 A1 | 11/2013 |
| WO | WO 2015/042171 A1 | 3/2015 |

OTHER PUBLICATIONS

International Search Report dated Jan. 24, 2017 in PCT/EP2016/075169 filed Oct. 20, 2016.

(Continued)

*Primary Examiner* — Ricky Q Ngo
*Assistant Examiner* — Ellen A Kirillova
(74) *Attorney, Agent, or Firm* — Oblon, McClelland, Maier & Neustadt, L.L.P.

(57) ABSTRACT

It is disclosed a method for performing a performance measurement on a packet flow transmitted along a path through a packet switched communication network. Two or more measurement points are implemented on the path. Each measurement point calculates a sampling signature for each received packet by applying a hash function to a mask of bits of the packet. Then, it selects a number of measurement samples amongst the received packets, the measurement samples being selected as those packets whose sampling signatures comprise a portion of length S equal to a predefined sampling value. While performing the selection, the measurement point counts the number of selected measurement samples and retroactively adjusts the length based on this number. Then, the measurement point provides measurement parameters relating to the selected measurement samples.

15 Claims, 5 Drawing Sheets

(58) Field of Classification Search
USPC .......................................................... 370/252
See application file for complete search history.

(56) References Cited

U.S. PATENT DOCUMENTS

| | | |
|---|---|---|
| 2009/0257352 A1 | 10/2009 | Imai |
| 2016/0197832 A1 | 7/2016 | Barry et al. |
| 2016/0205000 A1 | 7/2016 | Zhen |
| 2016/0212021 A1 | 7/2016 | Barry et al. |

OTHER PUBLICATIONS

Nick Duffield, "A Framework for Packet Selection and Reporting," AT&T Labs í Research, Internet Draft <draft-ietf-psamp-framework-06.txt>, XP015025920, Jul. 2004, 32 Pages.

T. Zseby, et al., "Sampling and Filtering Techniques for IP Packet Selection," AT&T Labs—Research, Internet Draft <draft-ietf-psamp-sample-tech-04.txt>, XP015025936, Feb. 2004, 37 Pages.

* cited by examiner

PERFORMANCE MEASUREMENT IN A PACKET-SWITCHED COMMUNICATION NETWORK

TECHNICAL FIELD

The present invention relates to the field of communication networks. In particular, the present invention relates to a method for performing a performance measurement in a packet-switched communication network. Further, the present invention relates to nodes and computers for communication network configured to implement such a method, and to computer networks comprising such nodes and computers.

BACKGROUND ART

In a packet-switched communication network, data are transmitted in the form of packets that are routed from a source node to a destination node through possible intermediate nodes. Exemplary packet-switched networks are IP (Internet Protocol) networks, Ethernet networks and MPLS (Multi-Protocol Label Switching) networks.

Packets not always reach the destination node, i.e. they may be lost during transmission through the network. Loss of packets is due to different reasons. For instance, a node or link may fail, or packets may be discarded by a node due to a congestion of its ports. Also, packets may be discarded by a node since they contain bit errors. In any case, when providing a service by transmitting data through a packet-switched network, the rate of packets lost during transmission affects the quality of service (QoS) of that service.

Typically, a packet is transmitted at a transmission time by the source node and is received at a reception time by the destination node. The time elapsing between transmission time and reception time is typically called "one-way delay". The one-way delay of a packet mainly depends on the number of possible intermediate nodes crossed by the packet from source to destination, the permanence time of the packet at each node and the propagation time along the links. Since the packets are routed hop-by-hop by each node, both the number of possible intermediate nodes crossed by packets and the permanence time of packets at each node are unpredictable. Accordingly, the one-way delay of a packet is almost unpredictable.

Moreover, packets of a same packet flow may have different one-way delays. The difference between the one-way delays of two packets of a same data flow is termed "interarrival jitter" (or, briefly, "jitter").

When a communication service (in particular, a real-time voice or data service such as call, conference call, video conference, etc.) is provided by means of a packet-switched network, a measurement of packet loss, one-way delay and jitter affecting the packet flow carrying the service provides an indication of the quality of service (QoS) perceived by the end users of the service. In addition, packet loss and high delay/jitter may require retransmission and then reduce the efficiency of the communication network. Therefore, measuring packet loss, one-way delay and/or jitter of packet flows in a communication network is of particular interest for network operators. WO 2015/042171 describes a network monitoring and analytics system which generates a sparse hash function value for each packet traversing the network and uses it as a unique identifier or thumbprint for the packet. As each packet traverses the network, the packet is identifiable at each node by the hash value identity generated for the packet. In particular, the system comprises a number of observation points which—for each single packet passing therethrough—calculate and record the sparse hash function value and generate analytics data. Analytics data generated at different measurement points for a same packet are then correlated for tracing the trajectory of each packet through the network and for measuring its delay.

SUMMARY OF THE INVENTION

The Applicant has noticed that the system described by WO 2015/042171 exhibits some drawbacks.

In particular, the Applicant has noticed that identifying each single packet traversing a network, generating analytics data for each identified packet and gathering all the analytics data generated by each observation point for each single packet entails generation, transmission and processing of a remarkable amount of data. Hence, a remarkable computation effort and bandwidth consumption is needed in the network.

On the other hand, while the hash function should yield a unique identification of each single packet, ambiguities may arise in concrete. Indeed, collisions between packets may occur, namely different packets may have a same hash function value (when the bits used for calculating the hash function value have the same value in different packets, or when such bits have different values in different packets but the hash functions provides the same result), meaning that they are not distinguishable at the observation points. If a reception sequence error occurs between two undistinguishable packets, the observation points can not detect the error and will provide erroneous analytic data for the packets involved in the reception sequence error.

The Applicant has noticed that, in principle, avoiding the generation, transmission and processing of a remarkable amount of data and increasing the robustness against reception sequence errors could be achieved by calculating, at each measurement point, a sampling signature for each received packet by applying a hash function to a predetermined mask of bits in the packet and by selecting a packet as a measurement sample if its sampling signature is equal to a predefined value H*, which will statistically happen for several packets, due to collisions of the hash function. This way, at each measurement point implemented on the path of the packet flow, the value H* of the sampling signature would allow selecting amongst the received packets a certain number of measurement samples, which would be the same at each measurement point.

Advantageously, the sampling rate (namely, the percentage of packets selected as measurement samples) would statistically depend on the length of the sampling signature. A shorter sampling signature would result in a statistically higher sampling rate, while a longer sampling signature would result in a statistically longer sampling rate.

The Applicant has noticed, however, that the number of measurement samples would depend both on the sampling rate and on the traffic heaviness (namely, on the number of received packets), which in many cases is unpredictable. Hence, while suitably tailoring the length of the sampling signature would allow statistically controlling the sampling rate, the number of measurement samples would be mainly out of control. This could give rise to critical situations. For instance, in heavy traffic situations (high number of received packets), a certain length of the sampling signature could provide an excessive number of measurement samples, which could be unmanageable by the available storage and computational resources. In light traffic situations (low number of received packets), besides, the same sampling signature length could provide an insufficient number of measurement samples (or even no measurement sample at all), which would make the measurement session invalid.

In view of the above, the Applicant has tackled the problem of providing a method for performing a performance measurement on a packet flow transmitted between two measurement points (nodes or computers) in a packet-switched communication network, which overcomes the aforesaid drawbacks, namely which does not require generation, transmission and processing of a remarkable amount of data, which is robust against reception sequence errors and which allows controlling the number of measurement samples.

In the following description and in the claims, the expression "performing a performance measurement on a packet flow" will designate an operation of measuring:
  a one-way delay, a two-way delay or a jitter induced on packets of said packet flow by transmission between the two measurement points; and/or
  a packet loss induced on packets of said packet flow by transmission between the two measurement points.

According to embodiments of the present invention, the above drawbacks are solved by configuring each measurement point to calculate and store, for each received packet, a sampling signature of $S_{max}$ bits (e.g. $S_{max}=32$). Then, the measurement point identifies the measurement samples as the received packets whose sampling signatures comprise a portion of S bits (e.g. the S most significant bits) equal to a certain sampling value $H_S^*$. According to the present invention, while the measurement point is performing the measurement sample selection on the received packets, it counts the number of selected measurement samples and retroactively adjusts the length S of the sampling signature portion used for measurement sample selection purposes, based on this number.

Hence, advantageously, the measurement point may automatically and autonomously control the number of measurement samples by adjusting the sampling rate in a dynamic way, through a dynamic and retroactive adjustment of the length S. This, for instance, allows the measurement sample to adjust the sampling rate so that, independently of the traffic conditions, the number of measurement samples does not exceed the storage and computational capabilities of the management server in charge of processing the measurement parameters provided by the various measurement points implemented in the network.

For instance, at the beginning of each measurement period, the measurement point may set the length S equal to the minimum value $S_0$, thereby starting to select the measurement samples at a maximum sampling rate dependent by $S_0$. For instance, if $S_0$ is equal to 0, at the beginning of the measurement period all the received packets are selected as measurement samples (sampling rate of 100%). In light traffic conditions, such a maximum sampling rate may anyway provide a number of measurement samples $n_{sample}$ not exceeding a maximum threshold $N_{max}$ within the measurement period. If, however, the traffic is heavier and $N_{max}$ is exceeded, the measurement point may halve the sampling rate both on the already received packets and on the packets which will be received from that moment on, by using $S=S_0+1$ bits of their sampling signatures for the purpose of measurement sample selection. The sampling rate may be further halved, if $N_{max}$ is exceeded again during the measurement period. And so on, until either the measurement period expires or a maximum length $S_{max}$ (corresponding to the minimum sampling rate applicable by the measurement point) is reached.

This way, by choosing the maximum threshold $N_{max}$ based on the storage and computational resources available at the management server, it is guaranteed that the number of measurement samples per measurement period is always manageable by the management server.

According to a first aspect, the present invention provides a method for performing a performance measurement on a packet flow transmitted along a path through a packet switched communication network, the method comprising, at each one of at least two measurement points implemented on the path:
  a) calculating a sampling signature for each received packet of the packet flow by applying a hash function to a mask of bits of the packet;
  b) selecting a number of measurement samples amongst the received packets, the measurement samples being selected as those received packets whose sampling signatures comprise a portion of length S equal to a predefined sampling value, counting a number of selected measurement samples and retroactively adjusting the length S based on the counted number of selected measurement samples; and
  c) providing measurement parameters relating to the measurement samples,
the method further comprising performing the performance measurement of the packet flow using the measurement parameters relating to the measurement samples.

According to preferred embodiments:
  step a) comprises calculating the sampling signatures for each packet received since the beginning of a measurement period,
  step b) comprises selecting the measurement samples amongst packets received since the beginning of the measurement period, and counting the number of measurement samples selected since the beginning of the measurement period; and
  step c) comprises providing measurement parameters relating to measurement samples selected during the measurement period.

Preferably, according to these embodiments, at step b) the retroactively adjusting comprises:
  b1) at the beginning of the measurement period, setting the length S equal to a minimum length $S_0$; and
  b2) each time the number of selected measurement samples exceeds a maximum threshold $N_{max}$ before expiration of the measurement period, increasing the length S, the maximum threshold $N_{max}$ indicating a maximum number of measurement samples for measurement period.

Preferably, step b2) comprises, each time the length S is increased from a first length equal to or higher than the minimum length $S_0$ to a second length:
  b2') considering the measurement samples which have been selected since the beginning of the measurement period by using the length S equal to the first length;
  b2") performing a further selection on those measurement samples by using the length S equal to the second length; and
  b2''') continuing using the length S equal to the second length for selecting further measurement samples amongst packets received from that moment on during the measurement period.

According to a preferred variant:
the measurement samples considered at step b2') and selected by using the length S equal to the first length are those received packets whose sampling signatures comprise a portion having the first length equal to a predefined first sampling value; and
the measurement samples further selected at step b2") and the further measurement samples selected at step b2''') are those received packets whose sampling signatures comprise a portion having the second length equal to a predefined second sampling value,
wherein a portion of the predefined second sampling value is equal to the predefined first sampling value.

Preferably, step c) comprises providing, for each selected measurement sample, a timestamp indicating a time at which the measurement sample has been received at the each one of the at least two measurement points.

According to preferred embodiments, step c) comprises providing, at the end of the measurement period, an ordered list of timestamps indicating the times at which the measurement samples selected at step b) during the same measurement period have been received at each one of the at least two measurement points.

According to some embodiments, performing the performance measurement comprises:
calculating a packet loss affecting the packet flow during the measurement period based on a number of timestamps comprised in the ordered list of timestamps provided by each one of the at least two measurement points;
if the packet loss is equal to 0, performing time measurements based on the ordered list of timestamps provided by each one of the at least two measurement points, the performing time measurements comprising:
performing an average time measurement for the measurement period based on an average value of the timestamps comprised in the ordered list of timestamps;
removing, from the ordered list of timestamps, timestamps of consecutive measurement samples whose reciprocal time distance, calculated as a difference between their timestamps, is lower than a predefined minimum threshold $TD_{min}$; and
performing an individual time measurement on each measurement sample whose timestamp has not been excluded from the ordered list of timestamps; and
if the packet loss is different from 0, avoiding any time measurement for that measurement period.

According to other embodiments, step c) further comprises providing, at the end of the measurement period, an ordered list of sampling signatures calculated at step a) for the measurement samples selected during the measurement period.

According to advantageous variants of these embodiments, providing the ordered list of sampling signatures comprises providing the predefined sampling value $H_S^*$ in a global variable of S bits and an ordered list of unused hashes, the unused hash of a measurement sample comprising the $S_{max}$-S bits of its sampling signature as calculated at step a) and not used for selecting the measurement sample at step b), $S_{max}$ being the length of the sampling signature.

According to these embodiments, preferably, performing the performance measurement comprises:
checking whether the at least two measurement points have applied a same length S for selecting the measurement samples as provided at the end of the measurement period;
if one measurement point of the at least two measurement points has applied a length S shorter than the length S applied by another measurement point of the at least two measurement points, excluding from the ordered list of timestamps provided by the one measurement point timestamps of measurement samples selected by the one measurement point and not by the another measurement point, the timestamps to be excluded being selected based on the sampling signatures provided by the one measurement point;
calculating a packet loss affecting the packet flow during the measurement period based on a number of timestamps comprised in the ordered list of timestamps;
if the packet loss is different from 0, excluding, from the ordered list of timestamps, timestamps of lost measurement samples, the lost measurement samples being identified based on the sampling signatures provided by each one of the at least two measurement points;
performing time measurements based on the ordered list of timestamps, the performing time measurements comprising:
performing an average time measurement for the measurement period based on an average value of the timestamps comprised in the ordered list; and
performing an individual time measurement on each measurement sample, each measurement sample being individually identified based on the sampling signatures provided by each one of the at least two measurement points.

Advantageously, the packet flow may be a multipoint packet flow.

According to a second aspect, the present invention provides a node for a packet switched communication network, the node being configured to receive a packet flow transmitted along a path through the packet switched communication network, the node being configured to:
a) calculate a sampling signature for each received packet of the packet flow by applying a hash function to a mask of bits of the packet;
b) select a number of measurement samples amongst the received packets, the measurement samples being selected as those received packets whose sampling signatures comprise a portion of length S equal to a predefined sampling value $H_S^*$, count a number of selected measurement samples and retroactively adjust the length S based on the counted number of selected measurement samples; and
c) provide measurement parameters relating to the measurement samples.

According to a third aspect, the present invention provides a communication network comprising at least a first node and a second node as set forth above.

According to a fourth aspect, the present invention provides a computer program product loadable in the memory of at least one computer and including software code portions for performing the steps of the method as set forth above, when the product is run on at least one computer.

BRIEF DESCRIPTION OF THE DRAWINGS

The present invention will become clearer from the following detailed description, given by way of example and not of limitation, to be read with reference to the accompanying drawings, wherein.

Figure 1:
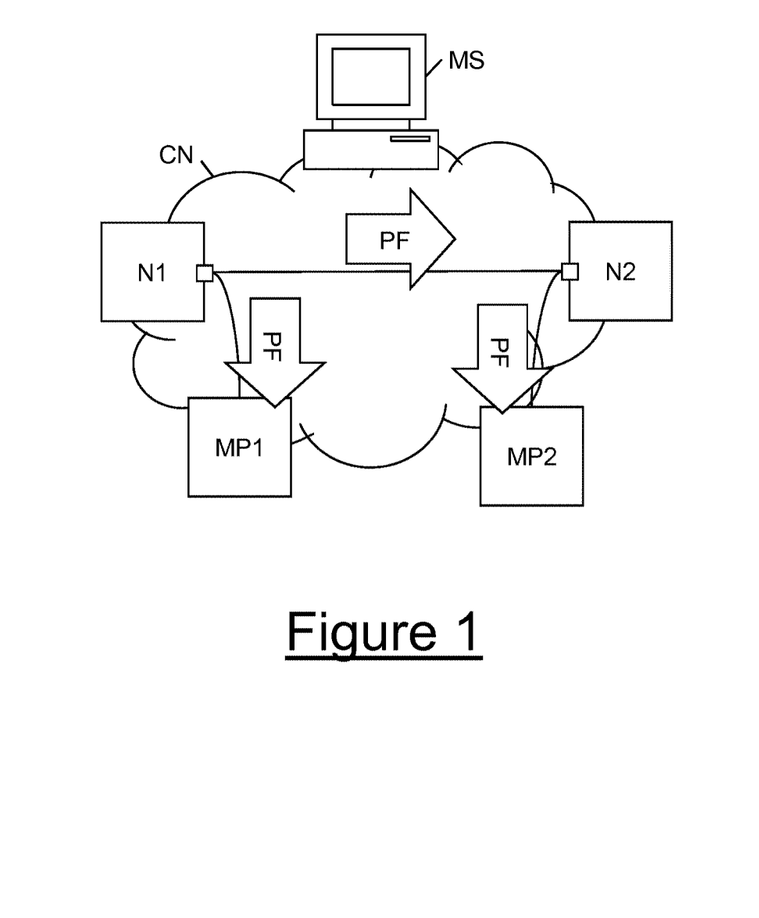
FIG. 1 schematically shows an exemplary packet-switched network.

Detailed description of preferred embodiments of the invention FIG. 1 schematically shows an exemplary packet-switched communication network CN in which the method for performing a performance measurement according to embodiments of the present invention is implemented. The communication network CN may be an IP network, an Ethernet network, an MPLS network or any other known type of packet-switched communication network.

The communication network CN comprises a plurality of nodes reciprocally interconnected by links according to any known topology. In particular, the communication network CN comprises a first node N1 and a second node N2.

Preferably, the communication network CN is also provided with a management server MS. The management server MS may be either a stand-alone server connected to any of the nodes of the communication network CN. Alternatively, the management server MS may be implemented at any of the nodes of the communication network CN.

A packet flow PF is preferably transmitted from the first node N1 to the second node N2, possibly through intermediate nodes (not shown in FIG. 1) of the communication network CN. The first node N1 may be either the source node of the packet flow PF or an intermediate node of the path from the source node to the destination node. Similarly, the second node N2 may be either the destination node of the packet flow PF or an intermediate node of the path from the source node to the destination node. Further, the packet flow PF may comprise packets generated by a same source node and addressed to a same destination node. Alternatively, the packet flow PF may be a "macro-flow" comprising packets generated by different source nodes and/or addressed to different destination nodes, which only share a length of their paths between the first node N1 and the second node N2.

Preferably, each packet Pki of the packet flow PF comprises a header and a payload. The payload comprises user data. Preferably, the header comprises information for routing the packet Pki. The header format depends on the protocol according to which the packets Pki are formatted.

Figure 2:
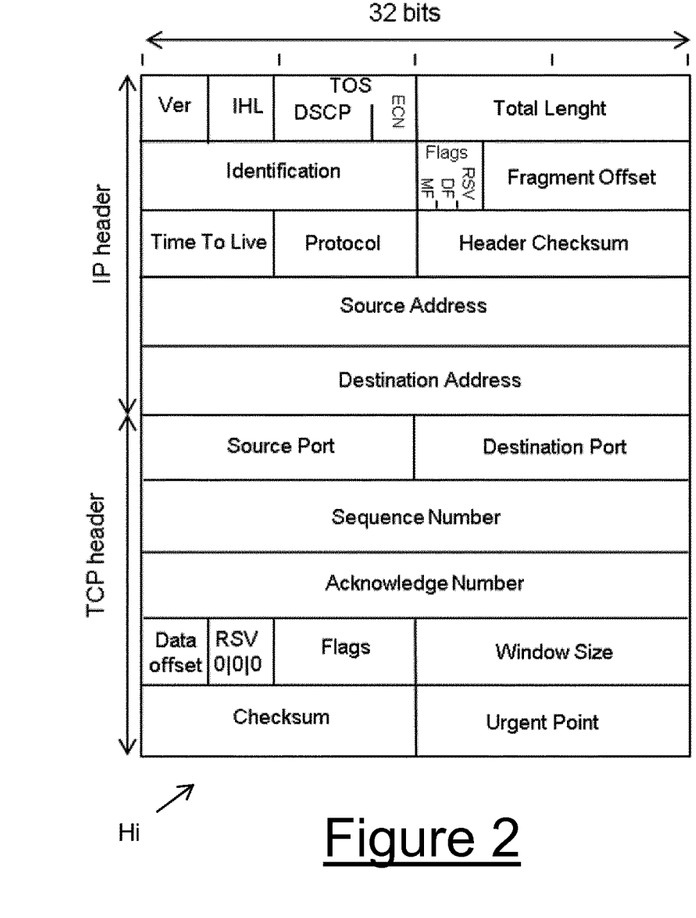
FIG. 2 schematically shows an exemplary packet header's structure.

By way of non limiting example, FIG. 2 shows the header Hi of a packet Pki formatted according to the known TCP (Transmission Control Protocol) over IPv4 (Internet Protocol Version 4). The header Hi comprises 40 bytes divided into 20 bytes for the IP header and 20 bytes for the TCP header. The TCP header in particular comprises the fields Source Port, Destination Port, Sequence Number, Acknowledge Number, Data Offset, RSV (reserved), Flags, Window Size, Checksum and Urgent Point.

Preferably, at least one measurement point is located on the path of the packet flow PF. In FIG. 1, by way of non limiting example, two measurement points are shown: a first measurement point MP1 implemented at the first node N1 and a second measurement point MP2 implemented at the second node N2. In particular, the first measurement point MP1 is preferably implemented at the output port of the first node N1 through which the packet flow PF is transmitted to the second node N2, while the second measurement point MP2 is preferably implemented at the input port of the second node N2 through which the packet flow PF is received from the first node N1. Each measurement point MP1, MP2 may be either embedded within the respective node N1, N2, or implemented as a stand-alone machine connected to the respective node N1, N2.

According to embodiments of the present invention, both the first measurement point MP1 and the second measurement point MP2 sample the packet flow PF, namely they select in the received packets of the packet flow PF a number of measurement samples by calculating a sampling signature of $S_{max}$ bits for each received packet and by selecting as measurement samples those ones whose sampling signatures comprise a portion of S bits (e.g. the S most significant bits) equal to a certain value $H_S^*$, S being comprised between a minimum value $S_0$ and $S_{max}$. According to the present invention, both the first measurement point MP1 and the second measurement point MP2 are also preferably configured to count the number of selected measurement samples and retroactively adjust the length S of the sampling signature portion used for measurement sample selection purposes between $S_0$ and $S_{max}$, based on this number.

More particularly, according to embodiments of the present invention, each measurement point MP1, MP2 preferably calculates for each packet Pki of the packet flow PF a respective sampling signature of $S_{max}$ bits by applying a predetermined hash function to a predetermined mask of bits in the packet, for instance in the packet header.

Preferably, the mask of bits to which the hash function is applied depends on the packet format, namely on the protocol according to which the packets Pki are formatted. In general, the mask of bits to be subjected to the hash function are selected according to one or more of the following criteria:

(i) their values shall be invariant through the path of the packet flow PF, or at least through the path length delimited by the nodes provided with measurement points. This way, each measurement point applying the hash function to the mask of bits of a certain packet Pki will obtain the same sampling signature value for that packet. It is therefore preferable avoiding bits of header fields whose values are changed at each node, such as for instance the TTL (Time To Live) field and CheckSum of the IP header. If NAT (Network Addres Translation) techniques are used, also the bits of the IP addresses shall be avoided;

(ii) their values shall be as entropic as possible within the packet flow PF, meaning that the probability that different packets Pki of the packet flow PF have the bits of the selected mask with the same values is as low as possible. It is therefore preferable avoiding bits of header fields whose values are always or often the same, such as for instance the TCP port field whose value is often 80. For the same reason, if the measurement point is located at an intermediate node of a tunnel carrying the packet flow PF, the tunnel header shall be avoided, since the packets Pki of the packet flow PF have all the same tunnel header; and (iii) they shall be easily accessible within the packets Pki. In particular, the bits of the selected mask are preferably always in the same position within the packet header, so that they may be easily retrieved by the measurement points without the need of parsing the packets or performing other complex processing of the packets.

For instance, if the packets Pki are formatted according to the above mentioned TCP over IPv4 protocol, the mask of bits to which the hash function shall be applied are preferably comprised in the TCP header, excluded the TCP Source Port field and the TCP Destination Port field, namely from 25° byte to 40° byte of the header Hi. In particular, the Checksum field of the TCP header exhibits a particularly high entropy (namely, the probability that different packets Pki of the packet flow PF have Checksum fields with the same value is particularly low), and is accordingly particularly suitable for the calculation of the sampling signature.

If the packets Pki are instead formatted according to the known TCP over IPv6 protocol, the above considerations on the TCP header still apply. The bytes 45° to 60° are then particularly preferred for the calculation of the sampling signature (an offset of 20 bytes shall be considered, since the IP header for IPv6 is 20 bytes longer than the IP header for IPv4).

If the packets are formatted according to any layer 2 protocol (e.g. Ethernet) or MPLS (Multi Protocol Label Switching), the above considerations still apply, provided a suitable offset is considered, because almost all the traffic is IP.

As to the hash function to the applied to the selected mask of bits in the packets Pki, any known hash function may be used, such as for instance:
- identity function, which provides as output the values of the bits of the mask. This hash function is preferred if the bits of the mask exhibit a high entropy, e.g. if their values have been calculated (e.g. by the source node) by applying a hash function (for instance the TCP Checksum field, which is computed from the TCP packet and part of IP Header resulting in an highly entropic value);
- binary XOR;
- one's complement sum, which is typically used at the nodes e.g. for the calculation of the IP Checksum and is easily implementable with general purpose HW;
- CRC (Cyclic Redundancy Check), which is typically used for error detection in Ethernet and is easily implementable on dedicated HW;
- MD5 (Message Digest 5), which is typically used for low security cryptography and may be implemented on general purpose HW;
- SHA-1 (Secure Hash Algorithm 1), which is typically used for medium security cryptography and may be implemented on general purpose HW.

The only requirement is that the hash function is simple enough to allow its calculation on each packet Pki of the packet flow PF.

With reference to the flow chart of FIG. 3, the operation of the measurement points MP1, MP2 during each measurement period according to a first embodiment of the present invention will be described in detail.

As a measurement period begins, each measurement point MP1, MP2 preferably sets the length S of the sampling signature portion to be used for selecting measurement samples equal to a minimum value $S_0$ (step 300). $S_0$ is preferably lower than $S_{max}$. Further, $S_0$ is preferably equal to or higher than 0.

Then, the measurement point MP1, MP2 starts receiving the packet flow PF (or a copy thereof) as transmitted by the node N1 or as received by the node N2, respectively (step 301). As a measurement point MP1, MP2 receives each packet Pki, it preferably generates its timestamp indicating the time at which the packet has been received (step 302) and calculates and stores its sampling signature of $S_{max}$ bits as described above (step 303).

The measurement point MP1, MP2 then preferably selects a number of measurement samples amongst the received packets (step 304). In particular, at step 304 the measurement point MP1, MP2 selects a received packet as a measurement sample if its sampling signature calculated at step 303 comprises a portion of S bits ($S=S_0$, at the beginning of the measurement period) equal to a predefined value $H_S^*$ ($H_S^*=H_{S0}^*$, at the beginning of the measurement period). For instance, the portion of $S=S_0$ bits considered by the measurement point MP1, MP2 at measurement sample selection purposes may be the $S=S_0$ most significant bits of the sampling signature.

This way, each measurement point MP1, MP2 basically identifies in the packets of the packet flow PF received during the current measurement period a number of measurement samples, whose sampling signatures comprise a portion of $S=S_0$ bits equal to $H_S^*=H_{S0}^*$.

According to an advantageous variant, at step 304 the measurement point MP1, MP2 preferably locally stores the value $H_S^*=H_{S0}^*$ in a global variable of $S=S_0$ bits. If, at step 304, the measurement point MP1, MP2 determines that a received packet is not a measurement sample, it preferably cancels its timestamp and sampling signature.

If, instead, the measurement point MP1, MP2 at step 304 determines that a received packet is a measurement sample, it preferably continues storing its timestamp and its sampling signature. According to an advantageous variant, the measurement point MP1, MP2 preferably stores not the whole sampling signature, but only the $S_{max}-S=S_{max}-S_0$ bits of its sampling signature not used for selecting the measurement samples (also termed herein after "unused hash").

Since the values of the bits of the mask to which the hash function will be applied in the packets Pki by the measurement point MP1, MP2 is unknown a priori, it is not possible to know in advance which packets Pki will have a sampling signature portion equal to $H_S^*=H_{S0}^*$, and therefore it is not possible to know a priori which packets will be selected as measurement samples by the measurement points MP1 MP2. This means that the measurement samples basically are selected in a random way.

This randomness however does not impair the measurement method, provided that the measurement points MP1, MP2 select the same packets Pki as measurement samples, which is guaranteed by using a same mask of bits, a same hash function, a same value of the length $S=S_0$ and a same sampling value $H_S^*=H_{S0}^*$ at all the measurement points (except possible packets losses or reception sequence errors involving the measurement samples between N1 and N2, as it will be described herein after).

Also, it shall be noticed that—in spite of the above randomness—the average sampling rate may be statistically controlled by suitably tailoring the length $S=S_0$ of the sampling signature portion to be used for selecting measurement samples. As known from the theory of hash functions, the sampling rate (namely, probability of finding a packet whose sampling signature comprises a portion of S bits equal to a value $H_S^*$) is $2^{-S}$, meaning that that value $H_S^*$ will be found every $2^S$ received packets on the average. For instance, S=1 provides a sampling rate of $2^{-1}=50\%$, S=2 provides a sampling rate of $2^{-2}=25\%$ and so on.

Figure 3:
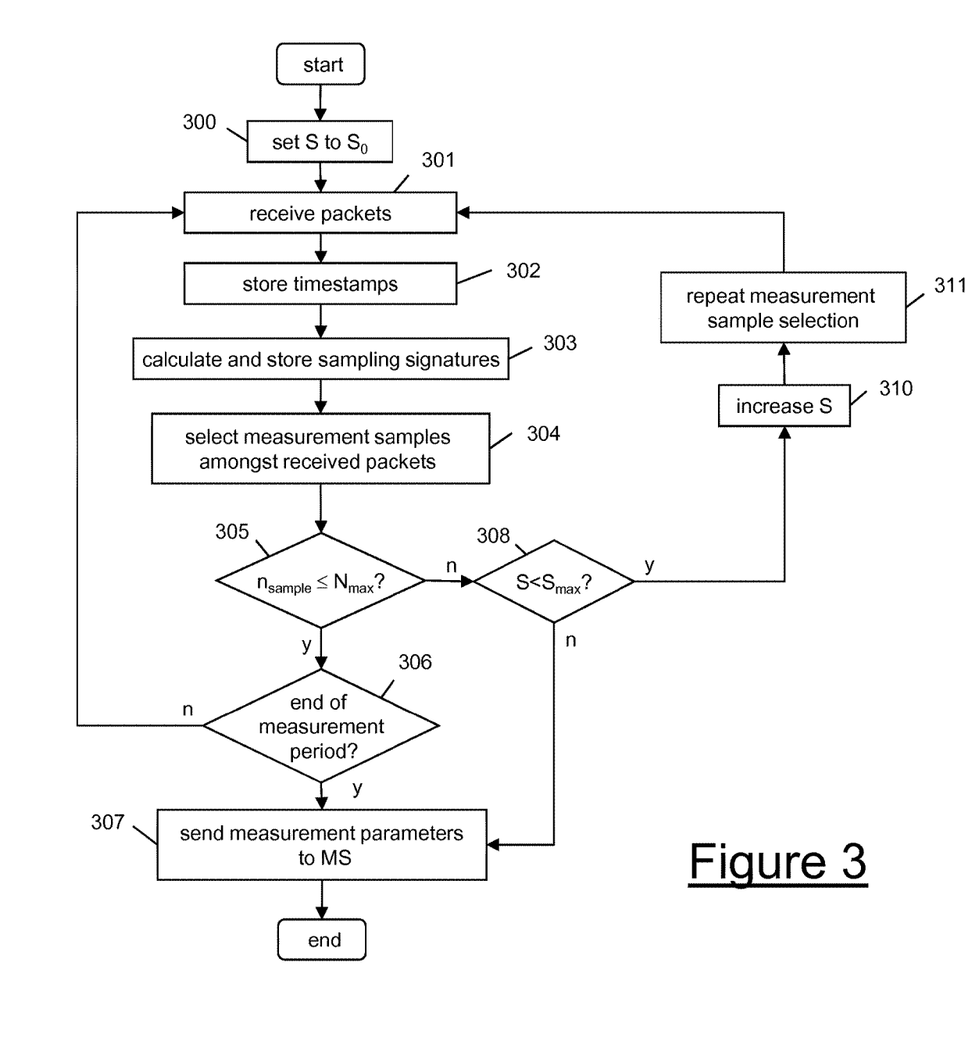
FIG. 3 is a flow chart of the operation of a measurement point according to embodiments of the present invention.

By referring again to the flow chart of FIG. 3, while the measurement point MP1, MP2 is performing the measurement sample selection at step 304, it preferably counts the number of measurement samples $n_{sample}$ selected since the beginning of the current measurement period.

While the number of measurement samples $n_{sample}$ does not exceed a maximum threshold $N_{max}$ (step 305), which indicates a maximum number of measurement samples per measurement period, the measurement point MP1, MP2 preferably continues selecting measurement samples amongst the received packets based on the value of a portion of $S=S_0$ bits of their sampling signatures (steps 301-304). The value of $N_{max}$ may be chosen according to the storage and computational resources available at the management server MS.

If the measurement period expires (step 306) before the number of measurement samples $n_{sample}$ reaches the maximum threshold $N_{max}$, the measurement point MP1, MP2 preferably sends to the management server MS measurement parameters relating to the measurement samples selected during that measurement period (step 307), which the management server MS will use for performing performance measurements relating to that measurement period. Step 307 and the subsequent processing of the performance parameters by the management server MS will be described in detail herein after.

If, at step 305 the measurement point MP1, MP2 determines that the number of measurement samples $n_{sample}$ has exceeded the maximum threshold $N_{max}$ before expiration of the measurement period, the measurement point MP1, MP2 preferably increases the length S of the sampling signature portion to be used for selecting measurement samples during the current measurement period.

In particular, as long as the length S of the sampling signature portion currently used for selecting measurement samples is lower than $S_{max}$ (step 308), the measurement point MP1, MP2 preferably increases the length $S=S_0$ by 1 (step 310), and repeats the measurement sample selection on the measurement samples already selected since the beginning of the current measurement period (step 311) using the increased length $S=S_0+1$ for the sampling signature portion to be used at selection purposes.

In particular, at step 311 the measurement point MP1, MP2 considers the stored sampling signatures of the measurement samples selected since the beginning of the measurement period and maintains as measurement samples only those ones whose sampling signatures comprises a portion of $S=S_0+1$ bits equal to a new predefined value $H_{S0+1}*$. Preferably, while the old value $H_{S0}*$ had $S_0$ bits, the new value $H_{S0+1}*$ has $S_0+1$ bits, the first $S_0$ bits being preferably equal to $H_{S0}*$ (for instance, if $S_0=3$, $H_{S0}*$ may be equal to "110" and $H_{S0+1}*$ may be equal to "1101").

As described above, according to an advantageous variant at step 304 the measurement point MP1, MP2 preferably locally stores the value $H_S*=H_{S0}*$ in a global variable of $S=S_0$ bits and, for each selected measurement sample, its timestamp and its unused hash of $S_{max}-S=S_{max}-S_0$ bits. According to such advantageous variant, at step 310 the measurement point MP1, MP2 preferably extends the global variable by one bit for storing the new value $H_{S0+1}*$ to be used for repeating the selection of the measurement samples. Then, since the first $S_0$ bits of the new value $H_{S0+1}*$ are equal to $H_{S0}*$, the measurement point MP1, MP2 preferably performs the re-selection of step 311 by checking, for each measurement sample selected since the beginning of the measurement period, whether the first bit of its unused hash is equal to the last bit of the new value $H_{S0+1}*$. In the negative, the measurement sample (namely, its stored timestamp and unused hash) is discarded. In the positive, the measurement sample is maintained. Hence, the measurement point MP1, MP2 maintains both its timestamp and it new unused hash, which is now of $S_{max}-S=S_{max}-S_0-1$ bits (the first bit of the old unused hash of $S_{max}-S_0$ bits being now equal to the last bit of $H_{S0+1}*$ for all the maintained measurement samples and being stored in the global variable).

Then, the measurement point MP1, MP2 continues using the increased length $S=S_0+1$ of the sampling signature portion for selecting sample measurements in the packets received during the current measurement period from that moment on (steps 301-304).

If the maximum threshold $N_{max}$ is exceeded again during the same measurement period (step 305), steps 308-311 may be repeated, namely, the length $S=S_0+1$ of the sampling signature portion to be used for selecting sample measurements during the current measurement period may be further increased to $S=S_0+2$. The increase of the length S may be repeated until (step 308) the length S reaches $S_{max}$, corresponding to the minimum sampling rate applicable by the measurement point MP1, MP2.

If, with $S=S_{max}$, the maximum threshold $N_{max}$ is reached again, the measurement point MP1, MP2 preferably suspends the selection of further measurement samples until the end of the measurement period and sends the measurement parameters relating to the selected measurement samples to the management server MS (step 307).

Preferably, the length of the sampling signature $S_{max}$ and the duration of the measurement period are chosen so that S will likely not reach $S_{max}$ before expiration of the measurement period, even under the worst traffic conditions, so that an unused hash is left for the selected measurement samples at the end of each measurement period.

For instance, it is assumed that the packet flow PF has a maximum throughput of 1 Gb/s, the measurement period is 1 second, the average packet length is 125 bytes (1000 bit) and about 100 samples per measurement periods are desired. In this scenario, the maximum number of received packets per measurement period is $10^6$ and, therefore, in order to provide 100 samples per period, a sample shall be selected every $10^6/100=10.000$ packets. This could be roughly achieved (rounded down) by using a value of S equal to 13, since $2^{13}=8.192$. This would provide $10^6/8.192=122$ samples per measurement period. By setting $S_{max}$ e.g equal to 32, it is guaranteed that S will never reach $S_{max}$ before expiration of a measurement period, with a minimum unused hash of 32−13=19 bits.

If the measurement period is increased to 300 seconds (5 minutes), the number of samples per measurement period could be roughly maintained in the order of magnitude of 100 by increasing S to 21, because $2^{21}=2.097$ and 300 $10^6/2.097=143$. Again, with $S_{max}$ equal to 32 it is guaranteed that S will not reach $S_{max}$ before expiration of the measurement period, even though with a reduced minimum unused hash of 32−21=11 bits.

If the maximum throughput of the packet flow PF is increased to 1 Tb/s while keeping the measurement period equal to 5 minutes, the number of samples per measurement period could be roughly maintained in the order of magnitude of 100 by increasing S to 30, because 300 $10^9/2^{30}=279$. Again, with $S_{max}$ equal to 32 it is guaranteed that S will not reach $S_{max}$ before expiration of the measurement period, even though with a further reduced minimum unused hash of 32−30=2 bits.

Hence, given a certain maximum throughput and a certain $N_{max}$, the duration of the measurement period and $S_{max}$ may be selected in order to guarantee that S will likely not reach $S_{max}$ before expiration of the measurement period. This guarantees that the measurement samples are statistically evenly distributed in the measurement period. Moreover, the unused hash (namely, the bits of the sampling signature not used for the purpose of selecting the measurement samples) may be used for the purpose of uniquely identifying the measurement samples, as it will be described in detail herein after.

An example will be now described with reference to FIG. 4.

Figure 4:
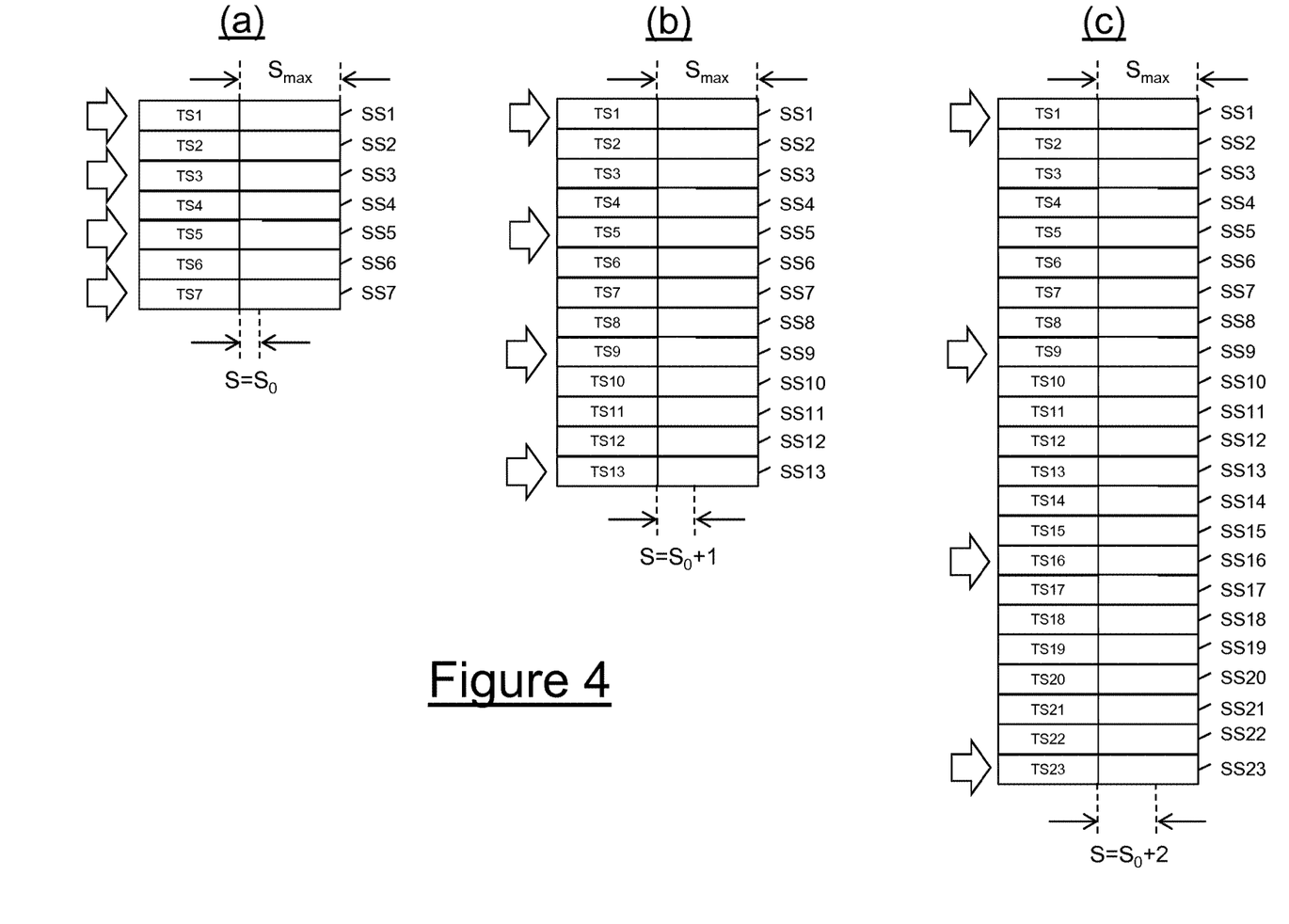
FIG. 4 shows an exemplary measurement sample selection performed by a measurement point operating according to embodiments of the present invention.

FIG. 4 shows information stored by a measurement point (e.g. MP1) for received packets of the packet flow PF at three different instants of a certain measurement period.

FIG. 4(a) shows that the measurement point has received seven packets whose timestamps TS1, TS2, . . . TS7 and sampling signatures SS1, SS2, . . . SS7 of $S_{max}$ bits calculated by the measurement point are locally stored.

As described above, at the beginning of the measurement period the measurement point starts selecting the measurement samples amongst the received packets as those whose sampling signature comprise a portion of $S=S_0$ bits equal to a predefined value $H_{S0}*$. FIG. 4(a) shows this situation, where $S_0$ is assumed to be equal to 1. Hence, the measurement point starts selecting the measurement samples as those received packets whose sampling signature comprises a certain bit (e.g. the most significant bit) equal to the predefined value $H_1*$, which may be e.g. "1". This way, the sampling rate is 50%, meaning that statistically one packet of two will be selected as a measurement sample. For instance, the selected measurement samples may be those indicated by arrows in FIG. 4(a), namely (TS1, SS1), (TS3, SS3), (TS5, SS5) and (TS7, SS7).

Assuming by way of example a maximum threshold $N_{max}=3$ (meaning that no more than 3 measurement samples may be provided in each measurement period), upon selection of the fourth measurement sample (TS7, SS7) the measurement point realizes that the maximum threshold $N_{max}$ has been exceeded.

Accordingly, the measurement point cancels the measurement sample selection shown in FIG. 4(a), increases $S=S_0=1$ to $S=S_0+1=2$ and repeats the measurement sample selection on the first seven received packets. Hence, as shown in FIG. 4(b), the measurement point now selects the measurement points as those received packets whose sampling signature comprises a portion of 2 bits (e.g. the 2 most significant bits) equal to the predefined value $H_2*$, which may be e.g. "11". This way, the sampling rate is 25%, meaning that statistically one packet of four will be selected as a measurement sample. For instance, the selected measurement samples may be those indicated by arrows in FIG. 4(b), namely (TS1, SS1) and (TS5, SS5). The measurement point then continues to select further measurement samples amongst packets received from that moment on. For instance, the further selected measurement samples may be those indicated by arrows in FIG. 4(b), namely (TS9, SS9) and (TS13, SS13).

Upon selection of the fourth measurement sample (TS13, SS13) the measurement point realizes that the maximum threshold $N_{max}$ has been exceeded again.

Accordingly, the measurement point cancels the measurement sample selection shown in FIG. 4(b), increases $S=S_0+1=2$ to $S=S_0+2=3$ and repeats the measurement sample selection on the first thirteen received packets. Hence, as shown in FIG. 4(c), the measurement point now selects the measurement points as those received packets whose sampling signature comprises a portion of 3 bits (e.g. the 3 most significant bits) equal to the predefined value $H_3*$, which may be e.g. "110". This way, the sampling rate is 12.5%, meaning that statistically one packet of eight will be selected as a measurement sample. For instance, the selected measurement samples may be those indicated by arrows in FIG. 4(c), namely (TS1, SS1) and (TS9, SS9). The measurement point then continues to identify further measurement samples amongst packets received from that moment on. For instance, the further selected measurement samples may be those indicated by arrows in FIG. 4(b), namely (TS16, SS16) and (TS23, SS23).

Should the number of selected measurement samples exceed again the maximum threshold $N_{max}$ before the measurement period is expired, the measurement point may further decrease the sampling rate by further increasing the length S of the sampling signature portion to be used for selecting measurement samples. The length S may be increased up to $S_{max}$, which corresponds to the minimum sampling rate applicable by the measurement point.

Hence, advantageously, the measurement points MP1, MP2 may automatically and autonomously control the number of measurement samples by adjusting the sampling rate in a dynamic way, through a dynamic adjustment of the length S.

In particular, as described above with reference to FIGS. 3 and 4, the measurement point may start with a maximum sampling rate and then reduce it during the measurement period step-by-step, each time the maximum number of measurement samples per period $N_{max}$ is exceeded. This way, the measurement point may adjust step-by-step the sampling rate so that, independently of the traffic conditions, the number of measurement samples does not exceed the storage and computational capabilities of the management server MS in charge of processing the measurement parameters provided by the various measurement points.

It may be further appreciated that, advantageously, even if the sampling rate is dynamically adjusted by the measurement point during the measurement period, by repeating at each adjustment of the length S the selection of the measurement samples on the packets received since the beginning of the measurement period, the measurement samples selected by the measurement point are statistically evenly distributed within the measurement period.

It shall also be noticed that the length S of the sampling signature portion used by the measurement point for selecting the measurement samples (and hence the sampling rate inherent thereto) affects not only the storage and computational effort required at the management server MS, but also the risk of reception sequence errors involving the measurement samples. In general, a higher length S (namely, a lower sampling rate) reduces the risk of reception sequence errors involving the measurement samples, because the measurement samples are statistically more spaced in time. On the other hand, however, a higher value of S makes the performance measurement results less accurate, in that they reflect more roughly the real behaviour of the whole packet flow PF.

Hence, as the length S is increased during the measurement period, the robustness of the performance measurement method against reception sequence errors increases, while the performance measurement results become less representative of the real behaviour of the packet flow PF.

As described above, at the end of a measurement period (step 306 in the flow chart of FIG. 3) each measurement point MP1, MP2 preferably sends to the management server MS measurement parameters relating to the selected measurement samples (step 307 in the flow chart of FIG. 3), which the management server MS then uses for performing at least one performance measurement relating to that measurement period.

In particular, according to an embodiment, at step 307 each measurement point MP1, MP2 preferably sends to the management server MS an ordered list of timestamps, each timestamp indicating the time at which a measurement sample has been received by the measurement point MP1, MP2.

Hence, by referring e.g. to the scenario of FIG. 1, the management server MS preferably receives an ordered list of timestamps $TSi^1$ from MP1 (i being an index ranging from 1 to n1, n1 being the number of measurement samples selected by MP1) and an ordered list of timestamps $TSj^2$ from MP2 (j being an index ranging from 1 to n2, n2 being the number of measurement samples selected by MP2).

Figure 5:
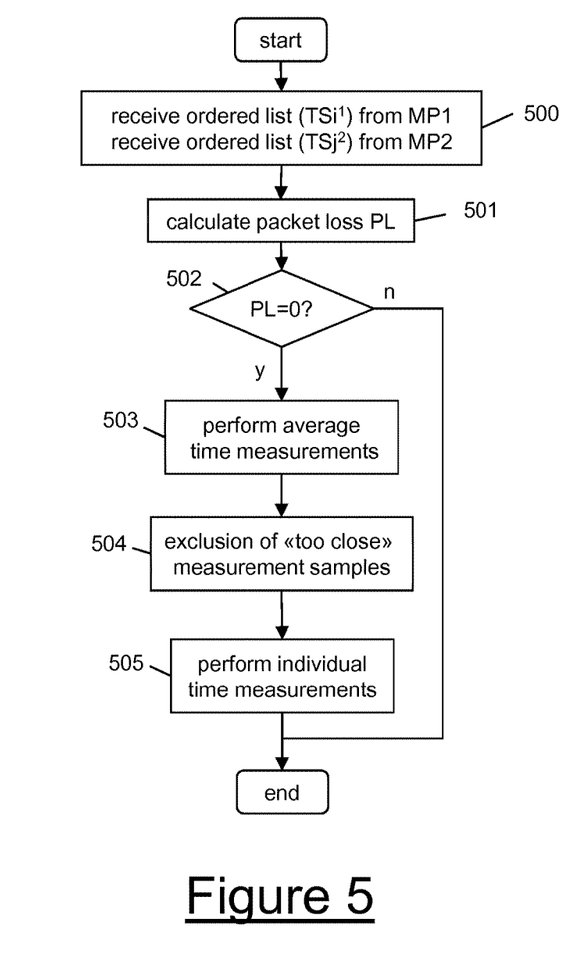
FIG. 5 is a flow chart of the operation of a management server according to an embodiment of the present invention.

With reference to the flow chart of FIG. 5, upon reception of such measurement parameters from MP1 and MP2 (step 500), the management server MS first of all calculates a packet loss PL affecting the measurement samples during that measurement period (step 501). To this purpose, the management server MS preferably counts the number n1 of timestamps received from MP1, the number n2 of timestamps received from MP2 and calculates the packet loss PL of the measurement samples as PL=n1-n2.

Then, if the packet loss PL is equal to 0 (meaning that n1=n2, namely that no measurement sample selected by MP1 has been lost) (step 502), the management server MS performs time measurements on the measurement samples based on the received timestamps.

In particular, the management server MS preferably performs average time measurements on the measurement samples (step 503). For instance, at step 503 the management server MS may calculate an average one-way delay AOWD from N1 to N2 by applying the following equation:

$$AOWD = \frac{\sum_{j=1}^{n2} TSj^2}{n2} - \frac{\sum_{i=1}^{n1} TSi^1}{n1}. \quad [1]$$

Average one-way jitter measurements may also be performed.

It may be appreciated that the average time measurements are valid independently of whether the measurement samples were subjected to reception sequence errors or not.

Then, the management server MS preferably excludes from subsequent time measurements "too close" measurement samples, namely measurement samples which could have been involved in reception sequence errors (step 504).

To this purpose, the management server MS preferably calculates a reciprocal time distance $TDi^1=TS(i+1)^1-TSi^1$ (i=1, 2, ... n1-1) for each pair of consecutive measurement samples selected at the first measurement point MP1. Then, the management server MS preferably compares all the calculated time distances $TDi^1$ with a predefined minimum threshold $TD_{min}$. For instance, the minimum threshold $TD_{min}$ may be set equal to the average one-way delay AOWD calculated at step 503. Alternatively, values higher than AOWD may be chosen for $TD_{min}$, e.g. if it is realized that the one-way delays of the measurement samples exhibit a high variance relative to the average value AOWD. This latter evaluation may be done e.g. during a preliminary measurement session, wherein the measurement samples are selected as described above, divided in sub-groups and an average one-way delay relating to each sub-group is calculated. In this case, the value of $TD_{min}$ to be used during the measurement session may be set equal to the maximum amongst the average one-way delays calculated for the various sub-groups.

If a time distance between two consecutive measurement samples is lower than the minimum threshold $TD_{min}$, the management server MS preferably removes from the ordered lists of timestamps received from both MP1 and MP2 the timestamps relating to those consecutive measurement samples. For instance, if $TDi^1$ calculated as described above is lower than $TD_{min}$, the third and fourth timestamps are removed from both the list received from MP1 and from the list received from MP2.

Then, the management server MS preferably performs individual time measurements on each measurement sample not excluded at step 504 (step 505). For instance, at step 505 the management server MS may calculate a one-way delay OWDi from N1 to N2 for each non excluded measurement sample by applying the following equation:

$$OWDi=TSj^2-TSi^1 \quad [2]$$

with i=j ranging from 1 to n1=n2, except the values corresponding to the measurement samples excluded at step 504.

One-way jitter measurements may also be performed.

It may be appreciated that, once the pairs of "too close" consecutive measurement samples have been excluded, the management server MS may assume that the remaining measurement samples are free from reception sequence errors. Hence, the management server MS may determine the timestamp from MP1 and the timestamp from MP2 to be used for the calculation relating to a same measurement sample exclusively based on the order in which the timestamps appear in the lists provided by MP1 and MP2.

If, at step 502, the management server MS determines that the packet loss PL is different from 0, the management server MS is incapable of determining which measurement samples selected by MP1 were lost. This prevents the management server MS from obtaining valid time measurements.

According to advantageous embodiments, at step 307 of the flow chart in FIG. 3 each measurement point MP1, MP2 sends to the management server MS not only the timestamps of the selected measurement samples, but also the associated sampling signatures calculated and locally stored at step 303.

In particular, according to an advantageous variant, at the end of each measurement period each measurement point MP1, MP2 preferably sends to the management server MS the value $H_S^*$ used for the selection of the measurement samples as stored in its global variable at the end of the measurement period and, for each selected measurement sample, its timestamp and its unused hash.

Hence, by referring again e.g. to the scenario of FIG. 1, the management server MS preferably receives, from the measurement point MP1, a value $H_S^{*1}$ and an ordered list of timestamps $TSi^1$ with associated respective unused hashes $UHi^1$ (i being an index ranging from 1 to n1, n1 being the number of measurement samples selected by MP1 during the measurement period) and, from the measurement point MP2, a value $H_S^{*2}$ and an ordered list of timestamps $TSj^2$ with associated respective unused hashes $UHj^2$ from the measurement point MP2 (j being an index ranging from 1 to n2, n2 being the number of measurement samples selected by MP2 during the measurement period).

Figure 6:
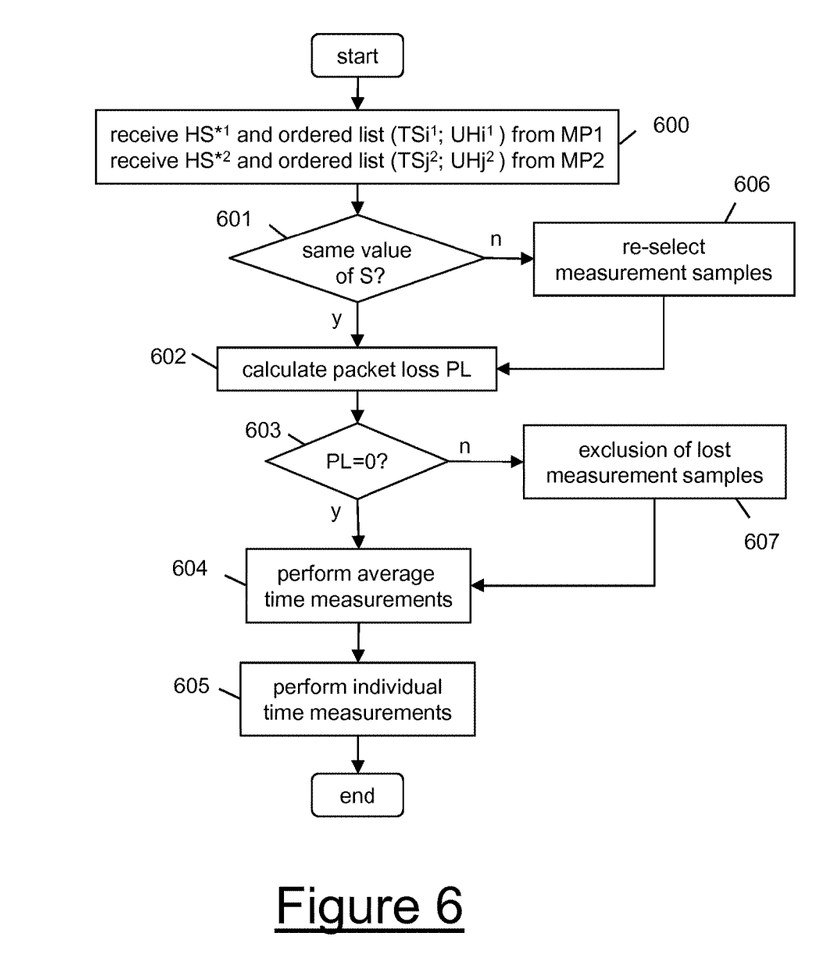
FIG. 6 is a flow chart of the operation of a management server according to another embodiment of the present invention.

With reference to the flow chart of FIG. 6, upon reception of such measurement parameters from MP1 and MP2 (step 600), the management server MS first of all checks whether the selection of measurement samples carried out by the measurement points MP1, MP2 has been done with a same value of the length S (step 601). According to a preferred variant, in order to perform the determination of step 601 the management server MS preferably checks whether $H_S^{*1}=H_S^{*2}$.

Indeed, though in principle the measurement points MP1, MP2 should have applied a same value of S for selecting the measurement samples (namely, $H_S^{*1}=H_S^{*2}$), in practice they might have used different values. For instance, in case one or more measurement samples identified by MP1 are lost, the measurement point MP2 finds a lower number of measurement samples than MP1. This could have caused the measurement point MP2 to apply a length S shorter than that applied by MP1 (namely, a higher sampling rate), so that $H_S^{*1}$ is equal to $H_S^{*2}$ with 1 or more bits appended thereto.

If at step 601 the managements server MS determines that both MP1 and MP2 have applied a same value of the length S for selecting the measurement samples, it preferably calculates the packet loss affecting the measurement samples (step 602), as explained above.

If the packet loss PL is equal to 0 (step 603), the management server MS preferably performs time measurements on the measurement samples based on the received timestamps.

In particular, the management server MS preferably performs average time measurements on the measurement samples (step 604) as described above. As discussed above, the average time measurements are valid independently of whether the measurement samples were subjected to reception sequence errors.

Then, the management server MS preferably performs individual time measurements on each measurement sample (step 605) as described above.

According to this second embodiment, at step 605 in order to properly correlate timestamps relating to a same measurement sample and provided by different measurement points, the management server MS preferably uses the sampling signatures which it received from MP1 and MP2 at step 307 of the flow chart of FIG. 3. In particular, the management server MS preferably performs an individual time measurement relating to a certain measurement sample (e.g. a one-way delay measurement as per equation [2] above) by using a timestamp $TSi^1$ from MP1 and a timestamp $TSj^2$ from MP2 whose associated sampling signatures have a same value.

It may be appreciated that, in order to determine whether two sampling signatures have a same value, the management server MS may limit itself to reading and checking only the unused hashes $UHi^1$ and $UHj^2$ of such sampling signatures, namely the portion which was not used by the measurement points MP1, MP2 for the purpose of selecting the measurement samples. Indeed, the sampling signature portion used at selection purposes is equal to $H_S^*$ for all the selected samples. This portion is therefore not useful for uniquely identify each sample, and may accordingly be disregarded by the management server MS.

Therefore, according to this embodiment, the management server MS is advantageously capable of uniquely identifying timestamps relating to a same measurement sample and originated at different measurement points MP1, MP2. Possible reception sequence errors involving two or more measurement samples accordingly do not impair the capability of the management server MS to properly identify timestamps relating to a same measurement sample and provide valid individual time measurements immune from those errors.

By referring again to the flow chart of FIG. 6, if at step 603 the management server MS determines that the packet loss PL is different from 0, the management server MS preferably excludes from subsequent time measurements the lost measurement samples, namely measurement samples which have been selected by MP1 but have not reached MP2 (step 607).

To this purpose, the management server MS preferably identifies as a lost measurement sample a sample whose sampling signature as received by MP1 is absent from the list of sampling signatures received from MP2. As discussed above, to this purpose the management server MS may limit itself to reading and checking only the unused hashes $UHi^1$ and $UHj^2$ as received from MP1 and MP2.

Then, the management server MS preferably performs average time measurements (step 604) on the measurement samples not excluded at step 607.

Then, the management server MS preferably performs individual time measurements (step 605) on the measurement samples not excluded at step 607. As described above, the timestamps provided by MP1 and MP2 for a same measurement sample are preferably identified by the management server MS using the values of the sampling signatures, in particular, their unused hashes $UHi^1$ and $UHj^2$.

If, at step 601, the management server MS realizes that the selection of measurement samples carried out by the measurement points MP1, MP2 has been done with different values of the length S (as described above, MP2 may have applied a value of S lower than the value applied by MP1, so that $H_S^{*1}$ is equal to $H_S^{*2}$ with 1 or more bits appended thereto), the management server MS preferably applies a further selection (step 606) to the measurement samples provided by MP2 by maintaining only the measurement samples whose sampling signatures comprise a portion of S bits having the value $H_S^{*1}$. The re-selection step is preferably based only on the unused hashes $UHj^2$ of the measurement samples selected by MP2, as described above in connection with step 311 of the flow chart of FIG. 3. This way, the management server MS excludes from the subsequent measurements the measurement samples which were selected by MP2 but not from MP1 due to different sampling rates.

The management server MS then preferably calculates the packet loss PL as described above (step 602), where n2 is calculated on the re-selected measurement samples of MP2 provided by step 606.

The management server MS then checks whether the packet loss PL is different from 0 (step 603).

If the packet loss PL is equal to 0, the management server MS performs average time measurements (step 604) and individual time measurements (step 605) for all the measurement samples as described above. If, instead, the packet loss PL is different from 0, the management server MS excludes the lost measurement samples (step 603) and then performs average time measurements (step 604) and individual time measurements (step 605) only on the not lost measurement samples.

Advantageously, the further selection applied a posteriori by the management server MS on the measurement samples selected by the measurement point which applied the higher sampling rate allows applying the performance measurement method also to multipoint packet flows.

In the present description and in the claims, the expression "multipoint packet flow" will designate a packet flow comprising packets which are transmitted along two, or more, at least partially non overlapping end-to-end paths, so that different packets of the multipoint packet flow may be received at different measurement points implemented along those paths. For instance, a multipoint packet flow may comprise two or more point-to-point packet flows with different source nodes and/or different destination nodes.

Figure 7:
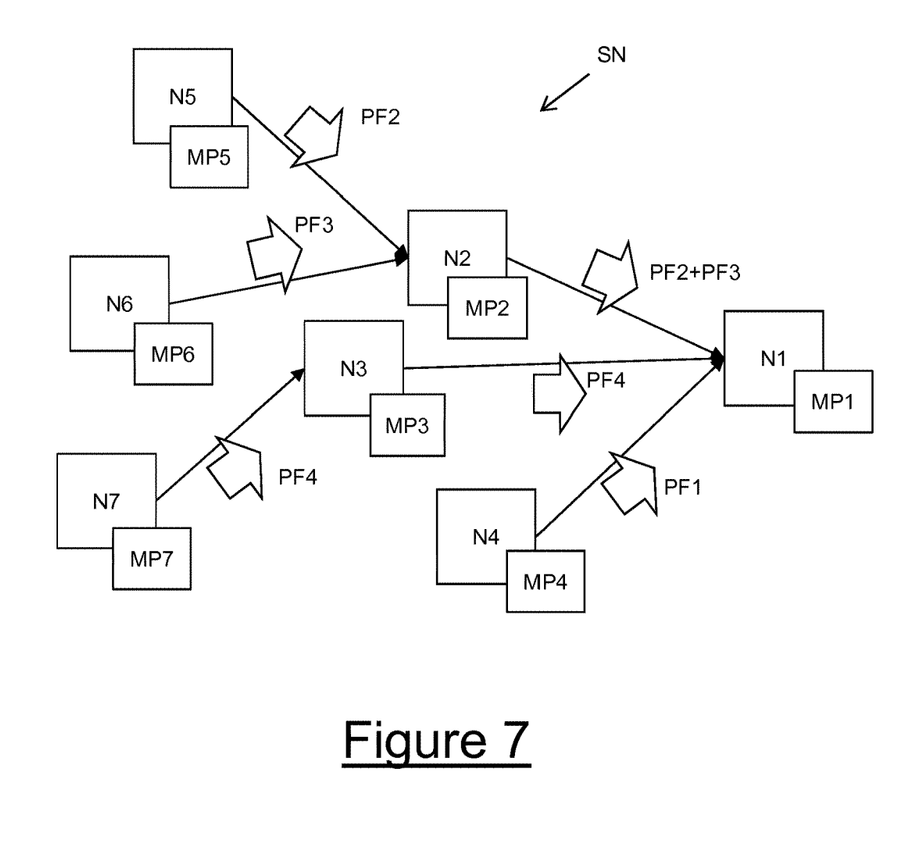
FIG. 7 schematically shows an exemplary subnetwork supporting transmission of a multipoint packet flow.

FIG. 7 schematically shows an exemplary subnetwork SN supporting transmission of a multipoint packet flow, in which the method for performing a performance measurement according to embodiments of the present invention is implemented.

The subnetwork network SN comprises a plurality of nodes N1, N2, . . . , N7 which, by way of non limiting example, are reciprocally interconnected according to a tree topology. In particular, node N1 is connected to N2, N3 and N4, nodes N5 and N6 are connected to node N2, while node N7 is connected to node N3.

The subnetwork SN supports transmission of a multipoint packet flow comprising four point-to-point packet flows PF1, PF2, PF3, PF4 originated by nodes N4, N5, N6, N7, respectively, and addressed to node N1. The packets of all the packet flows PF1, PF2, PF3, PF4 therefore have a same destination address, which defines the multipoint packet flow.

In order to perform a performance measurement on the multipoint packet flow, a monitoring network of measurement points is preferably implemented in the subnetwork SN. The monitoring network may comprise one or more measurement points for each node of the subnetwork SN. By way of non limiting example, the monitoring network shown in FIG. 7 comprises a measurement point MP1, MP2, . . . MP7 for each node N1, N2, . . . N7 of the subnetwork SN.

All the measurement points MP1, MP2, . . . MP7 are preferably capable of cooperating with a management server MS, not shown in FIG. 7 for simplicity.

In order to provide a performance measurement on the multipoint packet flow PF, at least one cluster of measurement points is preferably identified in the monitoring network of the subnetwork SN. A cluster is preferably defined as a set of measurement points of the monitoring network which exhibits the property that the ensemble of the packets received at the input measurement point(s) of the cluster is the same as the ensemble of the packets received at the output measurement point(s) of the cluster, if no packet loss occurs.

Different clusters may be identified in the monitoring network of the subnetwork SN shown in FIG. 7, for instance the cluster formed by the input measurement points MP2, MP3, MP4 and the output measurement point MP1.

Preferably, all the measurement points of the cluster MP1, MP2, MP3, MP4 operate according to the flow chart of FIG. 3.

Hence, at the cluster input side, during a certain measurement period, the measurement point MP2 preferably selects measurement samples amongst the packets of PF2 and PF3 based on a sampling signature portion having a dynamically adjustable length S2, the measurement point MP3 preferably selects measurement samples amongst the packets of PF4 based on a sampling signature portion having a dynamically adjustable length S3, and the measurement point MP4 preferably selects measurement samples amongst the packets of PF1 based on a sampling signature portion having a dynamically adjustable length S4.

At the cluster output side, during the same measurement period, the measurement point MP1 preferably selects measurement samples amongst the packets of PF1, PF2, PF3, PF4 based on a sampling signature portion having a dynamically adjustable length S1.

If all the measurement points of the cluster MP1, MP2, MP3, MP4 used a same value of the length S (namely, S1=S2=S3=S4) and if no packet loss occurred, the ensemble of measurement samples selected by input measurement points MP2, MP3, MP4 would be the same as the ensemble of the measurement samples selected by the output measurement point MP1. This would allow providing performance measurements relating to the cluster based on performance parameters provided by the various input and output measurement points of the cluster for those measurement samples.

However, since all the four packet flows PF1, PF2, PF3, PF4 are received at the output measurement point MP1, the number of measurement samples selected by MP1 is likely higher than the number of measurement samples selected by each one of MP2, MP3 and MP4, for same value of the length S (namely, for a same sampling rate). Therefore, the output measurement point MP1 will likely use a value S1 higher than S2, S3 and S4 for the length of the sampling signature portion used at selection purposes, in order to reduce the sampling rate and not to exceed the maximum number $N_{max}$ of measurement samples per measurement period.

According to advantageous variants, the value of $N_{max}$ applied by each measurement point MP1, MP2, MP3 and MP4 is suitably adjusted in order to induce all the measurement points MP1, MP2, MP3 and MP4 to apply a same value of S for the selection of the measurement samples. The values of $N_{max}$ for the various measurement points may be selected according to the topology of the cluster. For instance, in the exemplary scenario of FIG. 7, since MP1 receives the highest number of packets, a value of $N_{max}$ higher than the values of $N_{max}$ applied by MP2, MP2 and MP3 will likely induce MP1 to apply a value S1 equal to (or, al least, not too higher than) S2, S3 and S4. Alternatively, the values of $N_{max}$ for the various measurement points may be selected during a preliminary measurement session, wherein $N_{max}$ is firstly set to a same value for all the measurement points, then the values S1, S2, S3 and S4 applied by the measurement points are considered and, if one of them (S1, presumably) is significantly higher than the other ones, the value of $N_{max}$ applied by MP1 is gradually increased, until S1 becomes equal to (or, al least, not too higher than) S2, S3 and S4.

Figure 8:
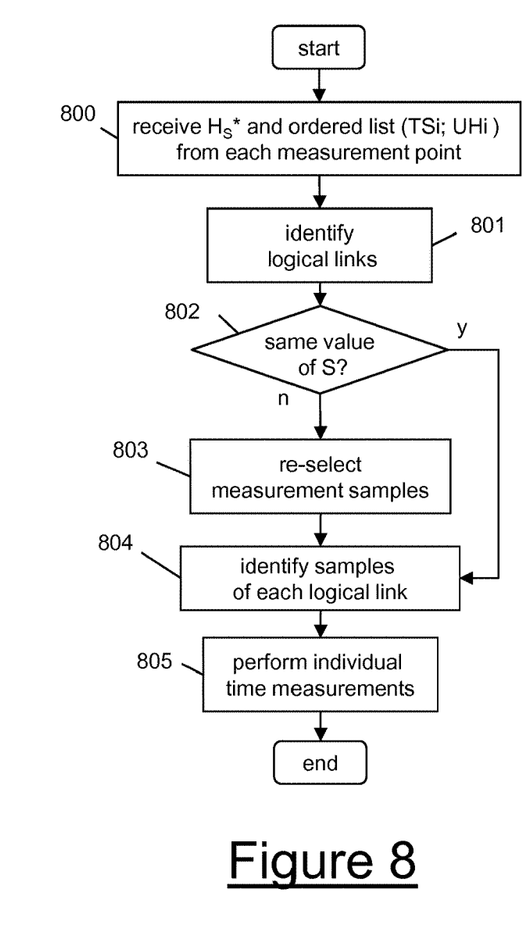
FIG. 8 is a flow chart of the operation of a management server according to still another embodiment of the present invention.

In order to provide performance measurements relating to the cluster in this situation (independently of whether the measurement points of the cluster have applied a same value or different values for $N_{max}$), the management server MS is preferably configured to operate according to the flow chart of FIG. 8.

In particular, the management server MS preferably receives from each measurement point MP1, MP2, MP3, MP4 both the timestamps and the sampling signatures (preferably in the form of $H_S^*$ and unused hashes) of the selected measurement samples (step 800).

Then, the management server MS preferably identifies all the logical links of the cluster (step 801), namely MP2-MP1, MP3-MP1 and MP4-MP1.

Then, for each identified logical link, the management server MS preferably checks whether the input measurement point initiating the logical link and the output measurement point terminating the logical link have applied the same value of the length S for the selection of the measurement samples.

If the management server MS determines that both the measurement points of a logical link have applied a same value of the length S, the management server MS preferably identifies measurement samples which were selected by both the measurement points (step 804). By referring e.g. to the logical link MP4-MP1, assuming that both MP1 and MP4 apply a same value for the length S (namely, S1=S4), MP4 selects measurement samples amongst the packets of PF4 only, while MP1 selects measurement samples also amongst the packets of PF1, PF2 and PF3. At step 804, only the measurement samples selected by both MP1 and MP4 amongst the packets of PF4 are identified.

In order to identify the measurement samples at step 804, the management server MS preferably uses the sampling signatures of the measurement samples, in particular their unused hashes, as described above.

Then, the management server MS preferably performs individual time measurements (step 805) relating to the various logical links. For each logical link, the individual time measurements are preferably performed only for the measurement samples identified at step 804 for that logical link. Again, in order to properly correlate timestamps relating to a same measurement sample and provided by the two measurement points of the logical link (e.g. MP4 and MP1), the management server MS preferably uses the sampling signatures of the identified measurement samples (in particular, their unused hashes), as described above.

An exemplary individual time measurement is the above mentioned one-way delay calculated, for each measurement sample, by applying the above equation [2] to the timestamps provided for that measurement sample by the two measurement points of the logical link.

In case the subnetwork SN is not synchronized, step 805 comprises calculating a two-way delay for each measurement sample identified for a logical link at step 804.

To this purpose, the measurement points of each logical link monitor a counter-propagating packet flow, by implementing thereupon the algorithm described above with reference to FIG. 3. Hence, the management server MS at the end of each measurement period receives from the measurement points of a logical link also performance parameters (namely, timestamps and sampling signatures, preferably in the form of $H_S^*$ and unused hashes) relating to the measurement samples selected amongst the packets of the counter-propagating packet flow. The management server MS preferably processes such performance parameters as described above, with reference to the flow chart of FIG. 8.

In particular, at step 804 the management server MS preferably identifies, in each propagation direction, the measurement samples selected at both the measurement points of a logical link. Then, the management sever MS considers one of the identified measurement samples in one direction and looks for a measurement sample matching with it in the other direction. More specifically, for each measurement sample in one direction, the measurement sample matching with it in the other direction is preferably selected as the one whose timestamp is the nearest, amongst the timestamps generated by one measurement point of the logical link for measurement samples propagating in the opposite direction, to the timestamp generated for the measurement sample to be matched by the same measurement point. According to preferred variants, the two counter-propagating measurement samples with nearest timestamps at one measurement point are actually matched and used for calculating the round-trip delay only if the difference between their timestamps does not exceed a predefined threshold. The threshold value depends on the quality of the local clocks of the nodes. The threshold may be for instance of a few seconds. The higher the clock quality, the higher the value at which the threshold may be set. It shall be also noticed that not all the measurement samples in one direction may have a measurement sample matching in the other direction, because the numbers of samples may be very different in the two directions (several samples in one direction and few samples in the other direction). Then, the one-way delays of the two measurement samples matching in the two opposite directions are calculated and summed up for providing a two-way delay.

The individual time measurements (one-way or two-way) calculated for each identified measurement sample of a logical link may be aggregated in order to provide a cumulative or average time measurement relating to that logical link.

By referring again to the flow chart of FIG. 8, if at step 802 the management server MS determines that the input measurement point initiating a logical link and the output measurement point terminating that logical link have applied different values of the length S for selecting the measurement samples (for instance, with reference to the logical link MP4-MP1, as discussed above MP4 might have applied a value of S lower than the value applied by MP1), the management server MS preferably applies a further selection (step 803) to the measurement samples provided by MP4 by maintaining only the measurement samples whose sampling signatures comprise a portion of S1 bits having the value $H_{S1}^*$, where S1 and $H_{S1}^*$ are the values applied by MP1. This way, the management server MS excludes from the subsequent time measurements the measurement samples which were selected by MP4 but not from MP1 due to different sampling rates.

The management server MS then preferably performs the identification step 804 described above, and then performs the individual time measurements 805 described above.

In the description, reference has been made to a "measurement period". According to preferred embodiments of the present invention, such marking periods are defined by applying to the packets of the packet flow PF (either point-to-point or multipoint) an alternate marking as described by WO 2010/072251 in the name of the same Applicant.

More particularly, by referring e.g. to the point-to-point scenario of FIG. 1, packets of the packet flow PF are marked (either at the node N1, or at a further node located upstream the node N1 which originated the packet flow PF) for dividing the packet flow PF in blocks. The packets Pki are marked e.g. by setting a bit of their header to "1" or "0", in such a way that blocks of packets marked by "1" alternate in time with blocks of packets marked by "0". The blocks may have a same duration Tb, corresponding to the measurement period (e.g. 5 minutes). The alternate marking, besides allowing each measurement point to identify each measurement period, also allows the measurement points providing further measurement parameters (in particular, a counter and a cumulative timestamp) relating to all the packets received during a measurement period, as described by WO 2010/072251 and WO 2013/174417 in the name of the same Applicant.

It shall be noticed that, since the sampling signature should comprise a portion of S bits equal to $H_S^*$ for all measurement samples, independently of their marking, the mask of bits upon which the hash function is applied for calculating the sampling signature preferably does not include the marking bit(s).

The invention claimed is:
1. A method for performing a performance measurement on a packet flow transmitted along a path through a packet switched communication network, said method comprising, at each one of at least two measurement points implemented on said path:
- a) calculating a sampling signature for each received packet of said packet flow by applying a hash function to a mask of bits of said packet;
- b) selecting a number of measurement samples amongst said received packets, said measurement samples being selected as those received packets whose sampling signatures comprise a portion of length S equal to a predefined sampling value, counting a number of selected measurement samples and retroactively adjusting said length S based on said counted number of selected measurement samples; and
- c) providing measurement parameters relating to said measurement samples, said method further comprising performing said performance measurement of said packet flow using said measurement parameters relating to said measurement samples.

2. The method according to claim 1, wherein:
step a) comprises calculating said sampling signatures for each packet received since the beginning of a measurement period,
step b) comprises selecting said measurement samples amongst packets received since the beginning of said measurement period, and counting said number of measurement samples selected since the beginning of said measurement period; and
step c) comprises providing measurement parameters relating to measurement samples selected during said measurement period.

3. The method according to claim 2, wherein at step b) said retroactively adjusting comprises:
- b1) at the beginning of said measurement period, setting said length S equal to a minimum length; and
- b2) each time said number of selected measurement samples exceeds a maximum threshold before expiration of said measurement period, increasing said length S, said maximum threshold indicating a maximum number of measurement samples for measurement period.

4. The method according to claim 3, wherein step b2) comprises, each time said length S is increased from a first length equal to or higher than said minimum length to a second length:
- b2') considering the measurement samples which have been selected since the beginning of said measurement period by using said length S equal to said first length;
- b2'') performing a further selection on said measurement samples by using said length S equal to said second length; and
- b2''') continuing using said length S equal to said second length for selecting further measurement samples amongst packets received from that moment on during said measurement period.

5. The method according to claim 4, wherein:
said measurement samples considered at step b2') and selected by using said length S equal to said first length are those received packets whose sampling signatures comprise a portion having said first length equal to a predefined first sampling value; and
said measurement samples further selected at step b2'') and said further measurement samples selected at step b2''') are those received packets whose sampling signatures comprise a portion having said second length equal to a predefined second sampling value,
wherein a portion of said predefined second sampling value is equal to said predefined first sampling value.

6. The method according to claim 1, wherein step c) comprises providing, for each selected measurement sample, a timestamp indicating a time at which said measurement sample has been received at said each one of said at least two measurement points.

7. The method according to claim 2, wherein said step c) comprises providing, at the end of said measurement period, an ordered list of timestamps indicating the times at which said measurement samples selected at step b) during said measurement period have been received at said each one of said at least two measurement points.

8. The method according to claim 7, wherein said performing said performance measurement comprises:
calculating a packet loss affecting said packet flow during said measurement period based on a number of timestamps comprised in said ordered list of timestamps provided by each one of said at least two measurement points;
if said packet loss is equal to 0, performing time measurements based on said ordered list of timestamps provided by each one of said at least two measurement points, said performing time measurements comprising:
performing an average time measurement for said measurement period based on an average value of said timestamps comprised in said ordered list of timestamps;
removing, from said ordered list of timestamps, timestamps of consecutive measurement samples whose reciprocal time distance, calculated as a difference between their timestamps, is lower than a predefined minimum threshold; and
performing an individual time measurement on each measurement sample whose timestamp has not been excluded from said ordered list of timestamps; and
if said packet loss is different from 0, avoiding any time measurement for said measurement period.

9. The method according to claim 7, wherein step c) further comprises providing, at the end of said measurement period, an ordered list of sampling signatures calculated at step a) for said measurement samples selected during said measurement period.

10. The method according to claim 9, wherein providing said ordered list of sampling signatures comprises providing said predefined sampling value in a global variable of S bits and an ordered list of unused hashes, the unused hash of a measurement sample comprising the $S_{max}$-S bits of its sampling signature as calculated at step a) and not used for selecting the measurement sample at step b), $S_{max}$ being the length of said sampling signature.

11. The method according to claim 9, wherein said performing said performance measurement comprises:
checking whether said at least two measurement points have applied a same length S for selecting said measurement samples as provided at the end of said measurement period;
if one measurement point of said at least two measurement points has applied a length S shorter than the length S applied by another measurement point of said at least two measurement points, excluding from said ordered list of timestamps provided by said one measurement point timestamps of measurement samples selected by said one measurement point and not by said another measurement point, said timestamps to be excluded being selected based on said sampling signatures provided by said one measurement point;

calculating a packet loss affecting said packet flow during said measurement period based on a number of timestamps comprised in said ordered list of timestamps;

if said packet loss is different from 0, excluding from said ordered list of timestamps timestamps of lost measurement samples, said lost measurement samples being identified based on said sampling signatures provided by each one of said at least two measurement points;

performing time measurements based on said ordered list of timestamps, said performing time measurements comprising:

performing an average time measurement for said measurement period based on an average value of said timestamps comprised in said ordered list; and performing an individual time measurement on each measurement sample, each measurement sample being individually identified based on said sampling signatures provided by each one of said at least two measurement points.

12. The method according to claim 1, wherein said packet flow is a multipoint packet flow.

13. A node for a packet switched communication network, said node being configured to receive a packet flow transmitted along a path through said packet switched communication network, said node comprising at least one computer configured to:

a) calculate a sampling signature for each received packet of said packet flow by applying a hash function to a mask of bits of said packet;

b) select a number of measurement samples amongst said received packets, said measurement samples being selected as those received packets whose sampling signatures comprise a portion of length S equal to a predefined sampling value, count a number of selected measurement samples and retroactively adjust said length S based on said counted number of selected measurement samples; and c) provide measurement parameters relating to said measurement samples.

14. A communication network comprising at least a first node and a second node according to claim 13.

15. A non-transitory computer-readable medium encoded with computer-readable instructions that, when executed by a computer, cause the computer to perform the method according to claim 1.

* * * * *